US012669971B2

(12) United States Patent
Yu et al.

(10) Patent No.: US 12,669,971 B2
(45) Date of Patent: Jun. 30, 2026

(54) ELECTRONIC DEVICE AND CONTROL METHOD THEREOF

(71) Applicant: SAMSUNG ELECTRONICS CO., LTD., Suwon-si (KR)

(72) Inventors: Jinkyu Yu, Suwon-si (KR); Seokbeom Kim, Suwon-si (KR); Inki Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/609,263

(22) Filed: Mar. 19, 2024

(65) Prior Publication Data

US 2024/0220182 A1 Jul. 4, 2024

Related U.S. Application Data

(63) Continuation of application No. PCT/KR2022/015439, filed on Oct. 12, 2022.

(30) Foreign Application Priority Data

Oct. 15, 2021 (KR) ........................ 10-2021-0137861

(51) Int. Cl.
*G06F 3/14* (2006.01)

(52) U.S. Cl.
CPC .................................. *G06F 3/1446* (2013.01)

(58) Field of Classification Search
CPC .. H04N 21/43; H04N 21/436; H04N 21/4363; H04N 21/431; G06F 3/14; G06F 3/1446
See application file for complete search history.

(56) References Cited

U.S. PATENT DOCUMENTS 8,955,005 B2 2/2015 Gava et al.
10,185,533 B2 1/2019 Kim et al.
(Continued)

FOREIGN PATENT DOCUMENTS

EP 3 732 670 B1 3/2023
KR 10-2014-0126606 10/2014
(Continued)

OTHER PUBLICATIONS

International Search Report, PCT/ISA/210, dated Jan. 27, 2023, in International Application PCT/KR2022/015439.
(Continued)

*Primary Examiner* — Shaheda A Abdin
(74) *Attorney, Agent, or Firm* — STAAS & HALSEY LLP

(57) ABSTRACT

An electronic device including a processor to obtain a first captured image of a display device outputting a first image; obtain proportion information of the display device based on size information of an area corresponding to the first image in the first captured image; obtain layout information of display modules of the display device based on the proportion information; allocate, based on the layout information, location information to areas respectively corresponding to the display modules in the first captured image; transmit, to the display device, a second image in which a first display module outputs an image different from those of remaining display modules; identify an area in which the different image is displayed in a second captured image of the display device outputting the second image; obtain location information corresponding to the identified area as location information of the first display module.

15 Claims, 10 Drawing Sheets

(56) References Cited

U.S. PATENT DOCUMENTS

| 11,163,516 B2 | 11/2021 | Son | |
| 2008/0186253 A1* | 8/2008 | Kim | G06F 3/1431 |
| | | | 345/581 |
| 2012/0013523 A1 | 1/2012 | Jaynes | |
| 2013/0249773 A1* | 9/2013 | Kato | G06F 3/1454 |
| | | | 345/2.1 |
| 2015/0279037 A1 | 10/2015 | Griffin et al. | |
| 2016/0139867 A1 | 5/2016 | Cha et al. | |
| 2018/0113664 A1 | 4/2018 | Zhao et al. | |
| 2020/0241828 A1 | 7/2020 | Noyelle et al. | |
| 2020/0293258 A1 | 9/2020 | Lin | |

FOREIGN PATENT DOCUMENTS

| KR | 10-2015-0075821 | 7/2015 |
| KR | 10-2016-0058498 | 5/2016 |
| KR | 10-2016-0077928 | 7/2016 |
| KR | 10-2019-0053032 | 5/2019 |
| KR | 10-2019-0138560 | 12/2019 |
| KR | 10-2164481 | 10/2020 |

OTHER PUBLICATIONS

Written Opinion, PCT/ISA/237, dated Jan. 27, 2023, in International Application PCT/KR2022/015439.
Office Action dated Jan. 7, 2026, issued in Korean Patent Application No. 10-2021-0137861.

* cited by examiner

<u>100</u>

1

DESIGNATED SIZE(120,120)

ACTUAL SIZE(100,100)

| COORDINATE | ACTUAL COORDINATE | | DESIGNATED COORDINATE | | SETTING VALUE |
|---|---|---|---|---|---|
| | Start xy | End xy | Start xy | End xy | xy |
| 0, 0 | 60, 50 | 160, 150 | 50, 40 | 170, 160 | 0, 0 |
| 0, 1 | 160, 50 | 260, 150 | 150, 40 | 270, 160 | 100, 0 |
| 0, 2 | 260, 50 | 360, 150 | 250, 40 | 370, 160 | 200, 0 |
| 0, 3 | 360, 50 | 460, 150 | 350, 40 | 470, 160 | 300, 0 |
| 0, 4 | 460, 50 | 560, 150 | 450, 40 | 570, 160 | 400, 0 |
| 0, 5 | 560, 50 | 660, 150 | 550, 40 | 670, 160 | 500, 0 |
| 1, 0 | 50, 150 | 160, 250 | 50, 140 | 170, 260 | 0, 100 |
| 1, 1 | 160, 150 | 260, 250 | 150, 140 | 270, 260 | 100, 100 |
| 1, 2 | 260, 150 | 360, 250 | 250, 140 | 370, 260 | 200, 100 |
| 1, 3 | 360, 150 | 460, 250 | 350, 140 | 470, 260 | 300, 100 |
| 1, 4 | 460, 150 | 560, 250 | 450, 140 | 570, 260 | 400, 100 |
| 1, 5 | 560, 150 | 660, 250 | 550, 140 | 670, 260 | 500, 100 |
| 2, 0 | 60, 250 | 160, 350 | 50, 240 | 170, 360 | 0, 200 |
| 2, 1 | 160, 250 | 260, 350 | 150, 240 | 270, 360 | 100, 200 |
| 2, 2 | 260, 250 | 360, 350 | 250, 240 | 370, 360 | 200, 200 |
| 2, 3 | 360, 250 | 460, 350 | 350, 240 | 470, 360 | 300, 200 |
| 2, 4 | 460, 250 | 560, 350 | 450, 240 | 570, 360 | 400, 200 |
| 2, 5 | 560, 250 | 660, 350 | 550, 240 | 670, 360 | 500, 200 |

FIG. 10

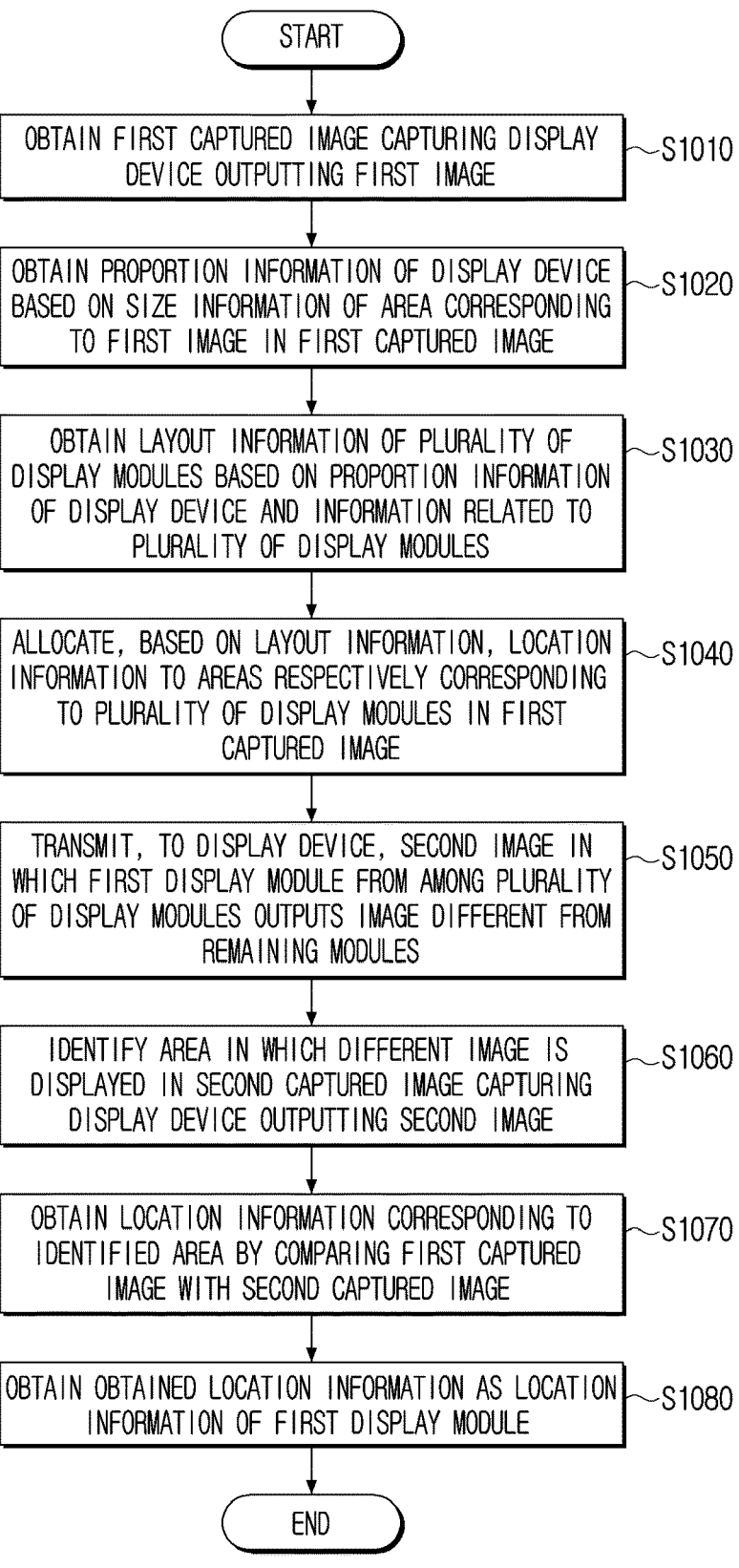

START

OBTAIN FIRST CAPTURED IMAGE CAPTURING DISPLAY DEVICE OUTPUTTING FIRST IMAGE ～S1010

OBTAIN PROPORTION INFORMATION OF DISPLAY DEVICE BASED ON SIZE INFORMATION OF AREA CORRESPONDING TO FIRST IMAGE IN FIRST CAPTURED IMAGE ～S1020

OBTAIN LAYOUT INFORMATION OF PLURALITY OF DISPLAY MODULES BASED ON PROPORTION INFORMATION OF DISPLAY DEVICE AND INFORMATION RELATED TO PLURALITY OF DISPLAY MODULES ～S1030

ALLOCATE, BASED ON LAYOUT INFORMATION, LOCATION INFORMATION TO AREAS RESPECTIVELY CORRESPONDING TO PLURALITY OF DISPLAY MODULES IN FIRST CAPTURED IMAGE ～S1040

TRANSMIT, TO DISPLAY DEVICE, SECOND IMAGE IN WHICH FIRST DISPLAY MODULE FROM AMONG PLURALITY OF DISPLAY MODULES OUTPUTS IMAGE DIFFERENT FROM REMAINING MODULES ～S1050

IDENTIFY AREA IN WHICH DIFFERENT IMAGE IS DISPLAYED IN SECOND CAPTURED IMAGE CAPTURING DISPLAY DEVICE OUTPUTTING SECOND IMAGE ～S1060

OBTAIN LOCATION INFORMATION CORRESPONDING TO IDENTIFIED AREA BY COMPARING FIRST CAPTURED IMAGE WITH SECOND CAPTURED IMAGE ～S1070

OBTAIN OBTAINED LOCATION INFORMATION AS LOCATION INFORMATION OF FIRST DISPLAY MODULE ～S1080

END

ELECTRONIC DEVICE AND CONTROL METHOD THEREOF

CROSS-REFERENCE TO RELATED APPLICATIONS

This application is a continuation of International Application No. PCT/KR2022/015439 designating the United States, filed on Oct. 12, 2022, in the Korean Intellectual Property Receiving Office and claiming priority to Korean Patent Application No. 10-2021-0137861, filed on Oct. 15, 2021, in the Korean Intellectual Property Office, the disclosures of which are incorporated by reference herein in their entireties.

BACKGROUND

Field

The disclosure relates to an electronic device and a control method thereof and, more particularly to, an electronic device that performs communication with a display device and a control method thereof.

Description of Related Art

Recently, various types of display devices have been developed and distributed.

In particular, as a display device becomes bigger and has a higher resolution, the number of display modules constituting a display apparatus increases proportionally.

As the number of display modules increases, installation difficulty increases, and particularly, there is a problem in that there is a difficulty for an installer in manually inputting a location, a layout, a connection relationship, etc. of each of a plurality of display modules when the display device is set, level of difficulty increases, and probability of installation error occurrence increases.

In the case of disposing and connecting display modules arbitrarily, not based on a predetermined rule when the display device is installed, there has been a need for a method for automatically identifying the locations of display modules and a connection relationship between modules without a separate setting operation, and completing the setting.

SUMMARY

The disclosure provides an electronic device that automatically identifies a location, a disposition relationship of display modules and a control method thereof.

An electronic device according to an embodiment includes a communication interface that communicates with a display device comprising a plurality of display modules; and a processor configured to obtain a first captured image of the display device outputting a first image, obtain proportion information of the display device based on size information of an area corresponding to the first image in the first captured image, obtain layout information of the plurality of display modules based on the proportion information of the display device and information related to the plurality of display modules, allocate, based on the layout information, location information to areas respectively corresponding to the plurality of display modules in the first captured image, transmit, to the display device through the communication interface, a second image in which a first display module from among the plurality of display modules outputs an image different from images of remaining display modules from among the plurality of display modules, identify an area in which the different image is displayed in a second captured image of the display device outputting the second image, obtain location information corresponding to the identified area by comparing the first captured image with the second captured image, and obtain the obtained location information as location information of the first display module.

Here, the processor may transmit, to the display device through the communication interface, a third image in which a second display module from among the plurality of display modules outputs an image different from images of remaining display modules from among the plurality of display modules, identify an area in which the different image is displayed in a third captured image of the display device outputting the third image, obtain location information allocated to the area where the different image is displayed among the location information allocated to the areas corresponding to each of the plurality of display modules by comparing the first captured image and the second captured image, and identify the location information as the location information of the second display module in the display device.

Here, the processor may transmit the location information of the first display module and the location information of the second display module to the display device through the communication interface.

In addition, the information related to the plurality of display modules may include at least one of information about a number of the plurality of display modules or information about a size of each of the plurality of display modules, and the processor may obtain plurality of candidate layout information based on the information about the number of the plurality of display modules, and identify any one of the plurality of candidate layout information based on the size information of each of the plurality of display modules and proportion information of the display device.

In addition, the first image may be an image in which each of the plurality of display modules outputs a same image.

The electronic device may further include a camera and a display, and the processor may provide the first captured image obtained through the camera through the display, control the display to display a guideline to distinguish areas corresponding to each of the plurality of display modules in the first captured image based on the layout information of the plurality of display modules, and while the second captured image obtained through the camera is displayed, control the display to display the guideline on an area corresponding to the display device in the second captured image.

In addition, the processor may allocate first coordinate information to an area corresponding to each of the plurality of display modules in the first captured image, allocate second coordinate information to an area in which the different image is displayed in the second captured image, identify an area corresponding to the second coordinate information among a plurality of first coordinate information, and obtain the location information corresponding to the identified area as location information of the first display module.

Here, the processor may allocate the first coordinate information by scaling a size of an area corresponding to each of the plurality of display modules, identify one first coordinate information comprising the second coordinate information among the plurality of first coordinate information, and obtain location information corresponding to the area to correspond to the identified first coordinate information as location information of the first display module.

A control method of an electronic device according to an embodiment includes obtaining a first captured image of a display device, including a plurality of display modules, outputting a first image, obtaining proportion information of the display device based on size information of an area corresponding to the first image in the first captured image, obtaining layout information of the plurality of display modules based on the proportion information of the display device and information related to the plurality of display modules, allocating, based on the layout information, location information to areas respectively corresponding to the plurality of display modules in the first captured image, transmitting, to the display device through a communication interface, a second image in which a first display module from among the plurality of display modules outputs an image different from images of remaining display modules from among the plurality of display modules, identifying an area in which the different image is displayed in a second captured image of the display device outputting the second image, obtaining location information corresponding to the identified area by comparing the first captured image with the second captured image, and obtaining the obtained location information as location information of the first display module.

Here, the method may further include transmitting, to the display device, a third image in which a second display module from among the plurality of display modules outputs an image different from images of remaining display modules from among the plurality of display modules, identifying an area in which the different image is displayed in a third captured image of the display device outputting the third image, obtaining location information allocated to the area where the different image is displayed among the location information allocated to the areas corresponding to each of the plurality of display modules by comparing the first captured image and the second captured image, and identifying the location information as the location information of the second display module in the display device.

Here, the method may further include transmitting the location information of the first display module and the location information of the second display module to the display device.

In addition, the information related to the plurality of display modules may include at least one of information about a number of the plurality of display modules or information about a size of each of the plurality of display modules, and the obtaining the layout information may further include obtaining plurality of candidate layout information based on the information about the number of the plurality of display modules, and identifying any one of the plurality of candidate layout information based on the size information of each of the plurality of display modules and proportion information of the display device.

In addition, the first image may be an image in which each of the plurality of display modules outputs a same image.

In addition, the method may further include providing the first captured image obtained through a camera through a display, displaying a guideline to distinguish areas corresponding to each of the plurality of display modules in the first captured image based on the layout information of the plurality of display modules, and while the second captured image obtained through the camera is displayed, displaying the guideline on an area corresponding to the display device in the second captured image.

In addition, the allocating the location information may include allocating first coordinate information to an area corresponding to each of the plurality of display modules in the first captured image, and the obtaining the location information may include allocating second coordinate information to an area in which the different image is displayed in the second captured image, identifying an area corresponding to the second coordinate information among a plurality of first coordinate information, and obtaining the location information corresponding to the identified area as location information of the first display module.

Here, the allocating the first coordinate information may include the allocating the first coordinate information by scaling a size of an area corresponding to each of the plurality of display modules, and the obtaining the location information may include identifying one first coordinate information comprising the second coordinate information among the plurality of first coordinate information, and obtaining location information corresponding to the area to correspond to the identified first coordinate information as location information of the first display module.

A computer-readable recording medium including a program for executing a control method of the electronic device according to an embodiment for achieving the aforementioned purpose of the disclosure, the control method of the electronic device includes obtaining a first captured image of a display device outputting a first image, obtaining proportion information of the display device based on size information of an area corresponding to the first image in the first captured image, obtaining layout information of the plurality of display modules based on the proportion information of the display device and information related to the plurality of display modules, allocating, based on the layout information, location information to areas respectively corresponding to the plurality of display modules in the first captured image, transmitting, to the display device through the communication interface, a second image in which a first display module from among the plurality of display modules outputs an image different from the images of the remaining modules, identifying an area in which the different image is displayed in a second captured image of the display device outputting the second image, obtaining location information corresponding to the identified area by comparing the first captured image with the second captured image, and obtaining the obtained location information as location information of the first display module.

According to various embodiments of the disclosure, configuration may be automatically completed when a display device including a plurality of display modules is assembled and set.

In addition, there is no need for a user to manually input a disposition relationship and a location relationship between the plurality of display modules, and the setting may be completed by automatically identifying the disposition and the location relationship.

BRIEF DESCRIPTION OF THE DRAWINGS

FIG. 10 is a flowchart illustrating a method for controlling an electronic device according to an embodiment of the disclosure.

DETAILED DESCRIPTION

Figure 1:
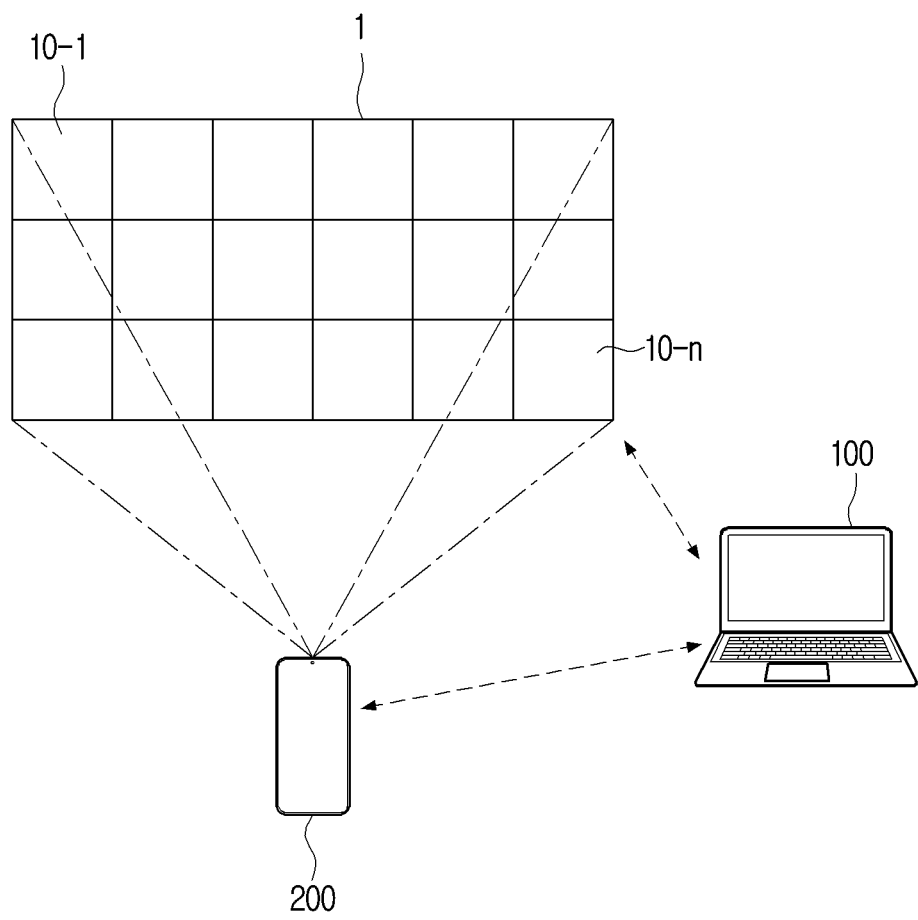
FIG. 1 is a diagram illustrating a display device and an electronic device according to an embodiment of the disclosure.

After terms used in the present specification are briefly described, the disclosure will be described in detail.

The terms used in the present specification and the claims are general terms identified in consideration of the functions of the various embodiments of the disclosure.

However, these terms may vary depending on intention, legal or technical interpretation, emergence of new technologies, and the like of those skilled in the related art. Also, there may be some terms arbitrarily identified by the applicant. Unless there is a specific definition of a term, the term may be construed based on the overall contents and technological common sense of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

As used herein, the terms "first," "second," or the like may identify corresponding components, regardless of importance of order, and are used to distinguish a component from another without limiting the components.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

Terms such as "module," "unit," "part," and so on may be used to refer to an element that performs at least one function or operation, and such element may be implemented as hardware or software, or a combination of hardware and software. Further, except for when each of a plurality of "module," "units," "parts," and the like needs to be realized in an individual hardware, the components may be integrated in at least one module or chip and may be realized in at least one processor (not shown).

Hereinafter, non-limiting example embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1 is a diagram illustrating a display device and an electronic device according to an embodiment of the disclosure.

Referring to FIG. 1, a display device 1 may be composed of a plurality of display modules 10-1 . . . 10-$n$. The display device 1 may display video data. The electronic apparatus 100 may be implemented as a television (TV), but is not limited thereto, and the electronic apparatus 100 may be implemented as a video wall, a large format display (LFD), a digital signage, a digital information display (DID), a projector display, or the like, having a display function.

According to an embodiment, the display device 1 may be implemented to include a plurality of display modules 10-1 . . . 10-$n$. For example, as illustrated in FIG. 1, a plurality of display modules 10-1 . . . 10-$n$ are combined to realize one display device (that is, the display device 1).

Each of a plurality of display modules 10-1 . . . 10-$n$ according to an embodiment may include a plurality of self-emissive elements. Here, the self-emissive elements may be at least one of a light emitting diode (LED) or a micro LED.

In addition, each of the plurality of display modules 10-1 . . . 10-$n$ may be implemented as an LED cabinet including a plurality of LEDs. Here, the LED may be implemented as an RGB LED, and the RGB LED may include a red LED, a green LED, and a blue LED. In addition, the LED may additionally include a white LED, in addition to the RGB LED.

According to an example, the LED may be implemented with a micro LED. Here, the micro LED is an LED of a size of approximately 5 to 100 micrometers, and is a subminiature LED emitting light by itself without a color filter.

Each of a plurality of display modules 10-1 . . . 10-$n$ provided in the display device 1 according to an embodiment may be connected to each other.

For example, at least one display module receiving a control signal, video data, or the like from the electronic device 100 may transmit a control signal, video data, or the like, received to another display module connected in series to the at least one display module, and accordingly, a control signal, video data, or the like may be sequentially transmitted to all of the plurality of display modules 10-1 . . . 10-$n$.

As another example, a processor provided in the display device 1 may transmit a control signal, video data, or the like, corresponding to the locations to each of a plurality of display modules 10-1 . . . 10-$n$ based on location information of each of a plurality of display modules 10-1 . . . 10-$n$. Accordingly, the display device 1 may output an image corresponding to the video data received from the electronic device 100 (e.g., source device).

According to an embodiment, as the resolution, size, etc. of the display device 1 increase, the number of a plurality of display modules 10-1 . . . 10-$n$ provided in the display device 1 also increases proportionally, and communication connection relationships between the plurality of display modules 10-1 . . . 10-$n$ may be complicatedly and variously modified in addition to related-art standardized communication connection relationships or Daisy chain communication connection relationships.

Also, as the resolution and the size of the display device 1 increase, when the number of the plurality of display modules 10-1 . . . 10-_n_ constituting the display device 1 increases, there is a problem in that a user (or a worker of installing the display device 1) may have a difficulty in manually setting the location, arrangement relationship, communication connection relationship, etc. of each of the plurality of display modules 10-1 . . . 10-_n_ in the display device 1.

Figure 2:
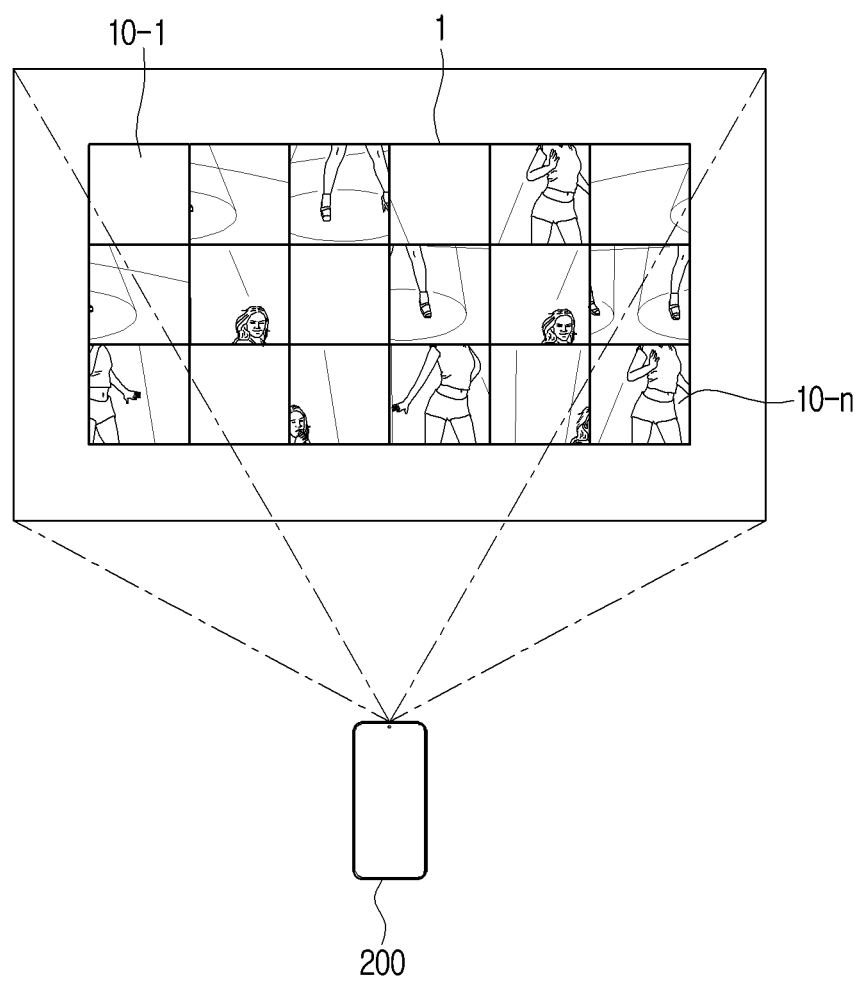
FIG. 2 is a diagram illustrating a display device before setting according to an embodiment of the disclosure.

A specific description thereabout will be provided with reference to FIG. 2.

FIG. 2 is a diagram illustrating a display device before setting according to an embodiment of the disclosure.

FIG. 2 illustrates that a total of 18 display modules 10-1 . . . 10-18 constitute one display device 1.

Referring to FIG. 2, since it is before setting the location information indicating where each of the plurality of display modules 10-1 . . . 10-_n_ is located in the display device 1, layout information (or disposition relationship information) of the plurality of display modules 10-1 . . . 10-_n_ (for example, information indicating that a total of 18 display modules are arranged in a layout of 6×3), an image output by the display device 1 is different from an image transmitted by the electronic device 100 (e.g., a source device) to the display device 1.

For example, the processor provided in the display device 1 may control the display device 1 to output an image (i.e., the entire image) received from the electronic device 100 by outputting a partial image corresponding to the location of each of the plurality of display modules 10-1 . . . 10-_n_ based on the location information of each of the plurality of display modules 10-1 . . . 10-_n_. In the meantime, before setting the location information of each of the plurality of display modules 10-1 . . . 10-_n_ and the layout information of the plurality of display modules 10-1 . . . 10-_n_, each of the plurality of display modules 10-1 . . . 10-_n_ does not output a part of the image corresponding to the location in the display device 1 and as shown in FIG. 2, there is a problem in that the display device 1 outputs a damaged image.

According to various embodiments of the disclosure, even if a user does not manually input location information (or identification information, etc.) indicating where each of a plurality of display modules 10-1 . . . 10-_n_ is located in the display device 1 or layout information (for example, arrangement relationship information of N×M) of the plurality of display modules 10-1 . . . 10-_n_ to the display device 1, the electronic device 100 may automatically obtain location information, layout information, and the like and transmit the same to the display device 1.

Returning to FIG. 1, the electronic device 100 according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) realization device, or a wearable device. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implantable circuit. In some embodiments, the electronic device 100 may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device 100 may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

Particularly, the electronic device 100 according to an embodiment of the disclosure may obtain layout information of the display device 1 and location information of each of a plurality of display modules 10-1 . . . 10-_n_ based on a first captured image and a second captured image received from the camera 200. A detailed description thereof will be provided below with reference to FIG. 4.

The camera 200 according to an embodiment of the disclosure may be located at a predetermined distance from the display device 1, and may be fixed to one place until capturing of each of the plurality of display modules 10-1 . . . 10-_n_) constituting the display device 1 is completed. The exposure, aperture, focus, etc. of the camera 200 may be automatically set, and may be manually set if the user wants. In addition, the exposure, aperture, focus, and the like of the camera 200 may be differently set according to the type of measurement equipment.

According to an embodiment, the camera 200 may be implemented in an external electronic device distinguished from the electronic device 100. For example, the camera 200 may refer to one component provided in the user terminal device.

In another example, the camera 200 may be implemented as one component of the electronic device 100. For example, the electronic device 100 and the camera 200 illustrated in FIG. 1 are implemented as one device, and the operations of the electronic device 100 and the camera 200 described below may be performed in one device.

According to an embodiment, each of a plurality of display modules 10-1 . . . 10-_n_ may display any one of a red color, a green color, a blue color, or a white color in a full color, and may display a specific character, a symbol, a shape, a pattern, various colors, etc. as another example, and the camera 200 may capture the display device 1 while each of the plurality of display modules 10-1 . . . 10-_n_ outputs an image and transmit the captured image to the electronic device 100.

Figure 3:
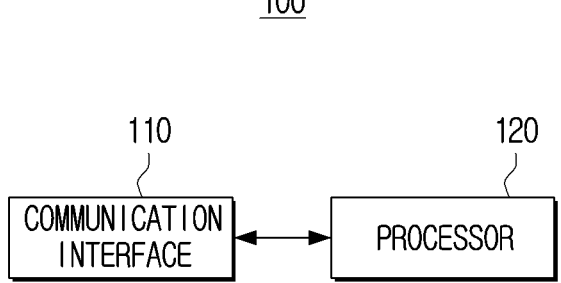
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, the electronic device 100 includes the communication interface 110 and the processor 120.

According to an embodiment, the communication interface 110 includes circuitry and may communicate with the display device 1. The communication interface 110 may communicate with the display device 1 based on a wired or wireless communication method.

For example, the communication interface 110 may transmit various data to the display device 1 under the control of the processor 120, and may receive various data from the display device 1.

Here, the communication interface 110 may transmit a control signal, an image, a test image, and the like to the display device 1 by using an Ethernet communication method under the control of the processor 120. Here, the connection cable between the communication interface 110 and the display devices 1 may use V-by-One, but is not limited to, and a cable like a High Definition Multimedia Interface (HDMI) cable, a Low Voltage Differential Signals (LVDS) cable, a Digital Visual Interface (DVI) cable, a D sub-miniature cable, a Video Graphics Array (VGA) cable, an optical cable, and the like, may be used.

According to another embodiment, the communication interface 110 may transmit to the display device 1 a control signal, an image, a test image, or the like, through wireless communication. In this example, the communication interface 110 may include a Wi-Fi module, a Bluetooth module, an IR module, a local area network (LAN) module, an Ethernet module, or the like. Here, each communication module may be implemented as at least one hardware chip. The wireless communication module may include at least one communication chip performing communication according to various wireless communication standards such as ZigBee, Ethernet, universal serial bus (USB), mobile industry processor interface camera serial interface (MIPI CSI), $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like. This is merely exemplary, and the communication interface 110 may use at least one communication module among various communication modules.

The processor 120 is electrically connected to a memory (not shown) and controls overall operations of the electronic device 100.

According to an embodiment of the disclosure, the processor 120 may be implemented as, for example, and without limitation, a digital signal processor (DSP) for processing of a digital signal, a microprocessor, a timing controller (TCON), or the like, but this is not limited thereto. The processor 120 may include, for example, and without limitation, one or more of a central processor (CPU), a micro controller unit (MCU), a micro-processor (MPU), a controller, an application processor (AP), a communication processor (CP), an advanced reduced instruction set computing (RISC) machine (ARM) processor, an artificial intelligence (AI) processor, or may be defined as a corresponding term. The processor 120 may be implemented in a system on chip (SoC) type or a large scale integration (LSI) type which a processing algorithm is built therein, or in a field programmable gate array (FPGA) type. The processor 120 may perform various functions by executing computer executable instructions stored in the memory 130.

The processor 120 according to an embodiment may transmit a test image to the display device 1. For example, the test image may be the same image that is output by each of the plurality of display modules 10-1 . . . 10-n, and will be collectively referred to a first image for convenience of description.

Then, the processor 120 may obtain the first captured image that captures the display device 1 outputting the first image from the camera 200.

Figure 4:
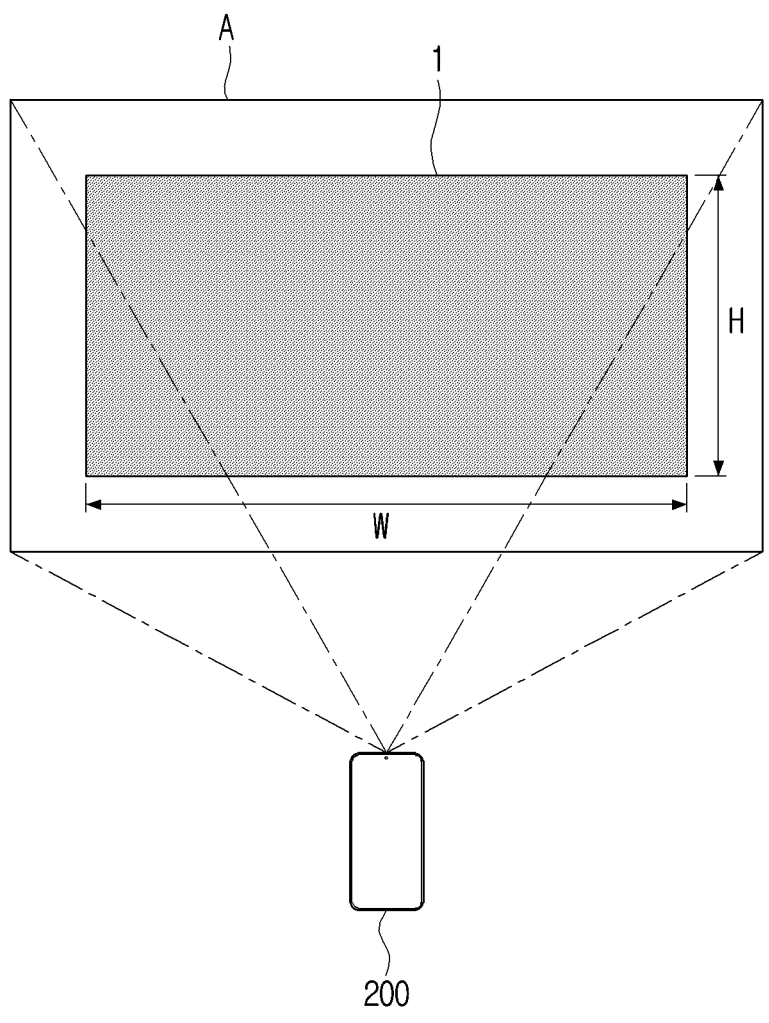
FIG. 4 is a diagram illustrating a first image according to an embodiment of the disclosure.

A specific description will be provided with reference to FIG. 4.

FIG. 4 is a diagram illustrating a first image according to an embodiment of the disclosure.

Referring to FIG. 4, the processor 120 may receive the first captured image A that captures the display device 1 through the camera 200.

According to an embodiment, the display device 1 is outputting a first image, and the first image may be an image output by each of the plurality of display modules 10-1 . . . 10-n as the same image. For example, each of the plurality of display modules 10-1 . . . 10-n may output a partial image of the same color or a partial image of the same pattern so that the display device 1 may output a first image of a single color or a first image of a single pattern.

The first image output by the display device 1 shown in FIG. 4 is merely an example, and the display device 1 may output a first image in which various colors are combined (or various patterns are combined). For example, each of the plurality of display modules 10-1 . . . 10-n may output a partial image of different colors or a partial image of different patterns.

The processor 120 according to an embodiment of the disclosure may when the first captured image A is received, obtain the proportion information of the display device 1 based on the size information of the area corresponding to the first image in the first captured image A.

For example, the first captured image A received from the camera 200 may include the display device 1 that is outputting a first image and a surrounding environment (e.g., a wall, a table, etc.) in which the display device 1 is disposed. According to an embodiment, the processor 120 may identify an area corresponding to a first image in the first captured image A, and may obtain proportion information (for example, a proportion of the width (W) and the height (H) of the display device) of the display device 1 by using the size information of the area corresponding to the first image. Here, the proportion information may also be referred to as aspect proportion information.

For example, the processor 120 may not identify length of each of the width W and the height H of the display device 1, but may obtain the proportion of the width W and the height H, that is, the aspect ratio, using the size information of the area corresponding to the first image in the first captured image A.

The processor 120 may obtain depth information by using a separate sensor (for example, a depth camera, etc.), obtain distance information from the camera 200 to the display device 1 based on the depth information, and obtain size information of the display device 1 based on the distance information and the size information of the area corresponding to the first image in the first captured image A (for example, length information of each of the width W and the height H of the display device 1).

The processor 120 may obtain layout information of the plurality of display modules 10-1 . . . 10-n based on the proportion information of the display device 1 and the information related to the plurality of display modules 10-1 . . . 10-n.

Figure 5:
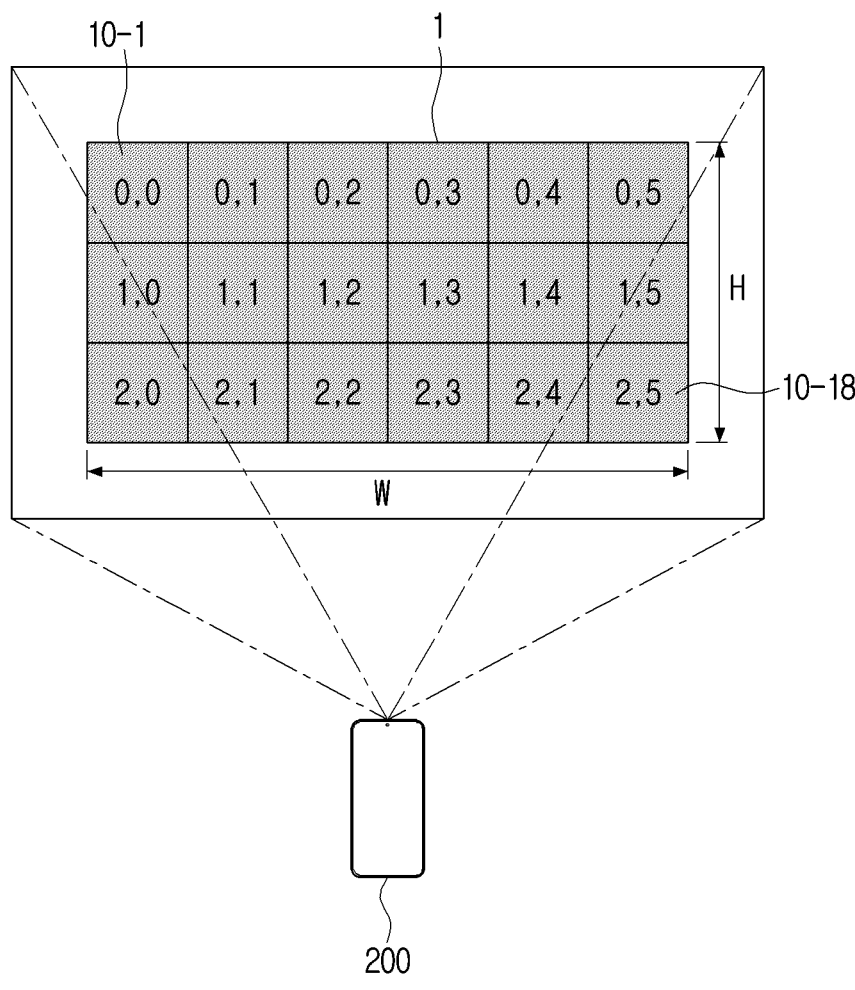
FIG. 5 is a diagram illustrating location information according to an embodiment of the disclosure.

A specific description will be provided with reference to FIG. 5.

FIG. 5 is a diagram illustrating location information according to an embodiment of the disclosure.

Referring to FIG. 5, the processor 120 may obtain layout information of a plurality of display modules 10-1 . . . 10-n based on the proportion information of the display device 1 and the information related to the plurality of display modules 10-1 . . . 10-*n*. Here, the information related to the plurality of display modules 10-1 . . . 10-*n* may include at least one of the number information of the plurality of display modules 10-1 . . . 10-*n* or the size information of each of the plurality of display modules 10-1 . . . 10-*n*.

A method of obtaining the layout information by the processor 120 may include four steps according to an embodiment.

<Step 1>

The processor 120 according to an embodiment may identify the number of a plurality of display modules 10-1 . . . 10-*n* constituting the display device 1 based on the number information and may identify the size (e.g., 320× 360) of each of a plurality of display modules 10-1, . . . , 10-*n* based on the size information, as illustrated in FIG. 5.

The processor 120 may obtain a plurality of candidate layout information based on the number information of the plurality of display modules 10-1 . . . 10-*n*. For example, when a total of 18 display modules 10-1 . . . 10-18 are identified as constituting the display device 1, the processor 120 may obtain a plurality of candidate layout information by identifying a configurable N×M (here, N, M is an integer). For example, the processor 120 may obtain a total of six candidate layout information (for example, 1×18, 2×9, 3×6, 6×3, 9×2, 18×1).

<Step 2>

Then, the processor 120 may obtain a proportion (width/ height) of the display device 1 based on proportion information of the display device 1 (for example, a proportion of the width W and the height H) of the display device 1 obtained based on the first captured image A. For example, it may be assumed that the proportion of the display device 1 is 16:9, that is, 1.778.

<Step 3>

Then, the processor 120 may obtain the candidate proportion by multiplying the size of the display module 10 by each of the plurality of candidate layout information obtained in step 1.

For example, if a total of 18 display modules 10-1 . . . 10-18 may constitute the display device 1, and the size of the display module 10 is 320×360, the processor may obtain a plurality of candidate proportion (N×width:M×height) as follows.

1st) (1×320 px):(18×360 px)=320:6480=0.049
2nd) (2×320 px):(9×360 px)=640:3240=0.198
3rd) (3×320 px):(6×360 px)=960:2160=0.444
4th) (6×320 px):(3×360 px)=1920:1080=1.778
5th) (9×320 px):(2×360 px)=2880:720=4
6th) (18×320 px)×(1×360 px)=5760:360=16

<Step 4>

As the 4th) candidate proportion (1.778) out of a total of six candidate proportions of i) to vi) according to an embodiment is the same as or similar to the proportion of the display device 1 obtained in step 2), and thus layout information, that is 6×3, may be obtained based on the 4th candidate proportion.

Then, the processor 120 may provide, based on the layout information, a guideline for distinguishing a plurality of display modules from the first captured image A, that is, distinguishing an area corresponding to each of the plurality of display modules.

As shown in FIG. 5, since a total of 18 display modules 10-1 . . . 10-18 constitute the display device 1, the processor 120 may add a guideline including a total of 18 cells to the first captured image A. Here, one cell corresponds to one display module.

The processor 120 according to an embodiment of the disclosure may allocate location information to areas corresponding to each of a plurality of display modules 10-1 . . . 10-*n* in the first captured image A based on layout information. Referring to FIG. 5, in the first captured image A, (0, 0) may be allocated to an area corresponding to the first display module 10-1, and (2, 5) may be allocated to an area corresponding to the eighteenth display module 10-18. The specific number is merely an example for convenience of description, and is not limited thereto.

Then, the processor 120 may control the communication interface 110 to transmit, to the display device 1, a second image in which any one of the plurality of display modules 10-1 . . . 10-*n* outputs an image different from those of the remaining display modules. A detailed description thereof is made with reference to FIG. 6.

Figure 6:
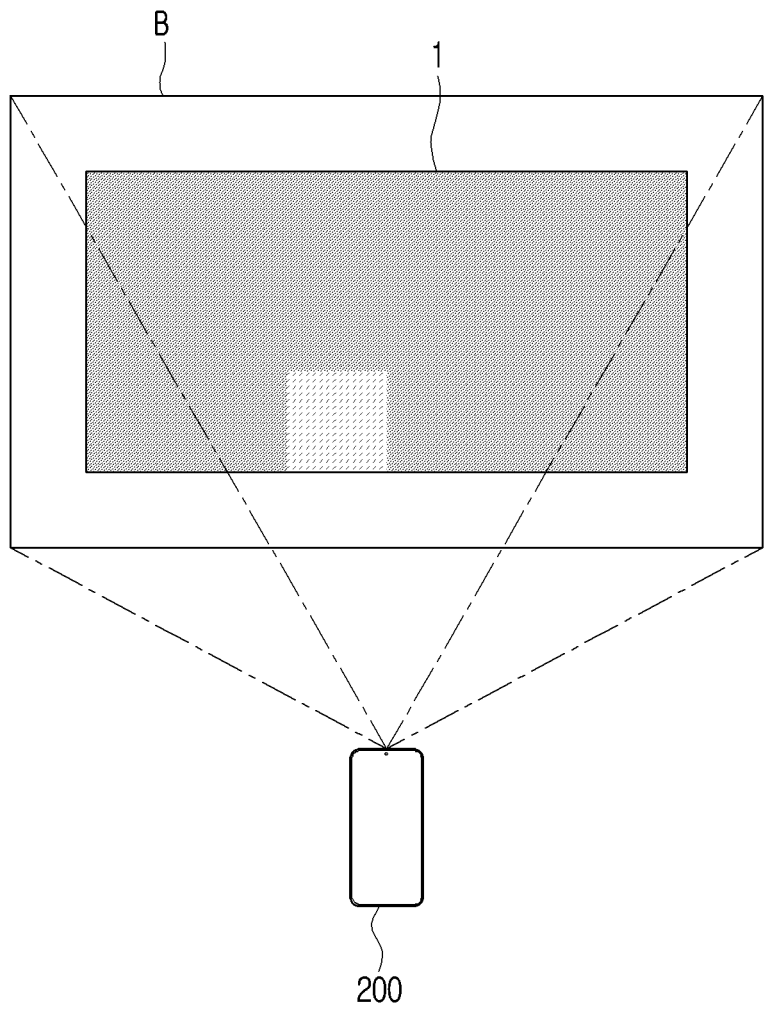
FIG. 6 is a diagram illustrating a second image according to an embodiment of the disclosure.

FIG. 6 is a diagram illustrating a second image according to an embodiment of the disclosure.

The processor 120 according to an embodiment of the disclosure may transmit, to the display device 1, a second image in which one of the plurality of display modules 10-1 . . . 10-*n* outputs an image different from the images of the remaining display modules.

The display device 1 having received the second image may output a second image by outputting, by any one of the plurality of display modules 10-1 . . . 10-*n* constituting the display device 1, an image different from the images of the remaining display modules.

Here, while the display device 1 is outputting the second image, the camera 200 may transmit the second captured image B capturing the display device 1 to the electronic device 100.

The camera 200 may be a component of the electronic device 100, and the processor 120 may display a captured image of the camera 200 (for example, a first captured image and a second captured image) through a display (not shown) provided in the electronic device 100.

For example, the first captured image A and the second captured image B illustrated in FIGS. 3 to 7 may be displayed through a display of the electronic device 100. In addition, the electronic device 100 may display a real-time image received from the camera 200.

The processor 120 according to an embodiment of the disclosure may identify an area corresponding to the display device 1 in the second captured image B while the second captured image B obtained through the camera 200 is displayed through the display.

Then, the processor 120 may display a guideline in an area corresponding to the display device 1 in the second captured image B. A detailed description thereof will be made with reference to FIG. 7.

Figure 7:
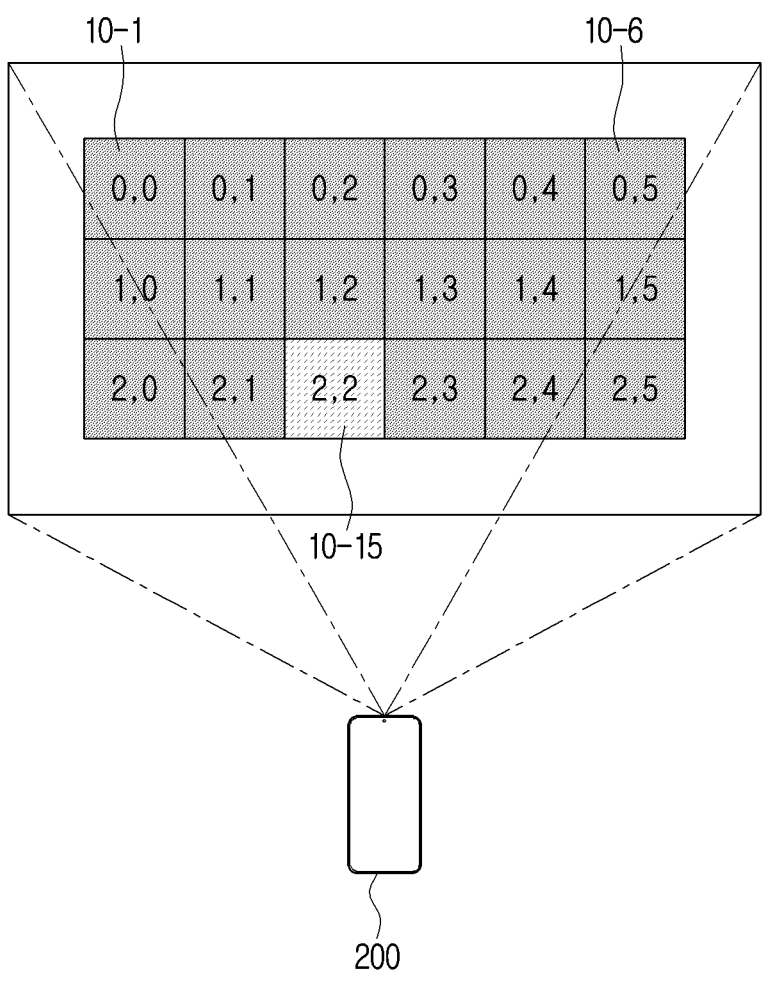
FIG. 7 is a diagram illustrating an area in which different images are displayed according to an embodiment of the disclosure.

FIG. 7 is a diagram illustrating an area in which different images are displayed according to an embodiment of the disclosure.

Referring to FIGS. 6 and 7, in the display device 1 displaying the second image, one display module among a plurality of display modules 10-1 . . . 10-*n* displays an image different from other display modules.

The processor 120 may identify an area in which different images are displayed in the second captured image. Then, the first captured image A (see FIGS. 4 and 5) and the second captured image B (see FIGS. 6 and 7) may be compared to obtain location information of an area in which different images are displayed.

For example, it is assumed that the fifteenth display module 10-15 among a total of 18 display modules 10-1 . . . 10-*n* outputs an image different from other display modules.

In this example, the processor 120 may identify an area where a different image is displayed based on the second captured image B, but it is not identifiable whether the identified area corresponds to the fifteenth display module 10-15.

Accordingly, the processor 120 may identify an area corresponding to an area (i.e., an area in which a different image is displayed) identified in the second captured image B in the first captured image A by comparing the first captured image A with the second captured image B.

For example, when it is identified that an area (that is, an area where the different images are displayed) identified in the second captured image B is similar to (or identical to) an area corresponding to the fifteenth display module 10-15 in the first captured image A, location information (for example, (2, 2)) allocated to the fifteenth display module 10-15 may be obtained as location information of the fifteenth display module 10-15, and the obtained location information may be transmitted to the display device 1.

In the meantime, the display device 1 may receive location information from the electronic device 100 to identify where any one display module currently displaying a different image is located within the display device 1. That is, the display device 1 may identify that the fifteenth display module 10-15 is located in the third row and the third column in the plurality of display modules 10-1 . . . 10-*n*.

The processor 120 may iteratively perform steps according to the description of FIGS. 6 and 7.

<Iteration 1>

For example, the processor 120 may transmit, to the display device 1, a second image in which one of the plurality of display modules 10-1 . . . 10-*n* outputs an image different from the remaining display modules.

Then, the processor 120 may obtain location information of any one display module for outputting different images while the display device 1 outputs the second image and transmit the location information to the display device 1.

<Iteration 2>

Then, the processor 120 may transmit, to the display device 1, a third image in which any one of the remaining display modules except for the display module in which the location is identified outputs different images in the iteration 1.

The processor 120 may obtain location information of any one display module for outputting different images while the display device 1 outputs the third image and transmit the location information to the display device 1.

The processor 120 according to an embodiment of the disclosure may adjust the number of iteration times based on the number information of the plurality of display modules 10-1 . . . 10-*n*.

The processor 120 may obtain location information of each of the plurality of display modules 10-1 . . . 10-*n* constituting the display device 1 and transmit the location information to the display device 1, and the display device 1 may identify a location in the display device 1 of each of the plurality of display modules 10-1 . . . 10-*n*.

Accordingly, the processor 120 may automatically obtain location information, layout information, and the like of the electronic device 100 and transmit the same to the display device 1 without manually inputting, to the display device 1, location information (or identification information, etc.) indicating where each of the display modules 10-1 . . . 10-*n* is located in the display device 1 or layout information (for example, arrangement relationship information of N×M) of the plurality of display modules 10-1 . . . 10-*n*.

Figure 8:
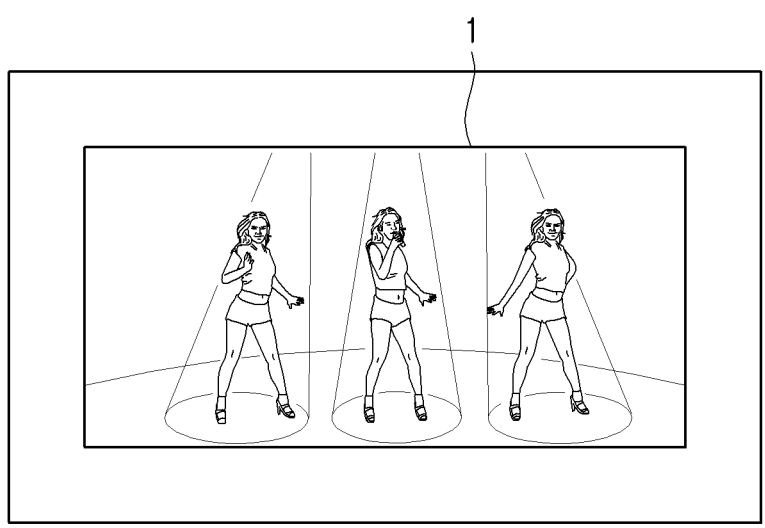
FIG. 8 is a diagram illustrating a display device after setting according to an embodiment of the disclosure.

FIG. 8 is a diagram illustrating a display device after setting according to an embodiment of the disclosure.

Referring to FIG. 8, unlike FIG. 2, the processor included in the display device 1 may output a partial image corresponding to a location of each of the plurality of display modules 10-1 . . . 10-*n* based on the location information of each of the plurality of display modules 10-1 . . . 10-*n* to control the display device 1 to output an image (i.e., an entire image) received from the electronic device 100.

In the step before setting, as shown in FIG. 2, the display device 1 outputs a damaged image, but in the step after setting, as shown in FIG. 8, the display device 1 may output an entire image that is not damaged, that is, an image received from a source device.

Figure 9:
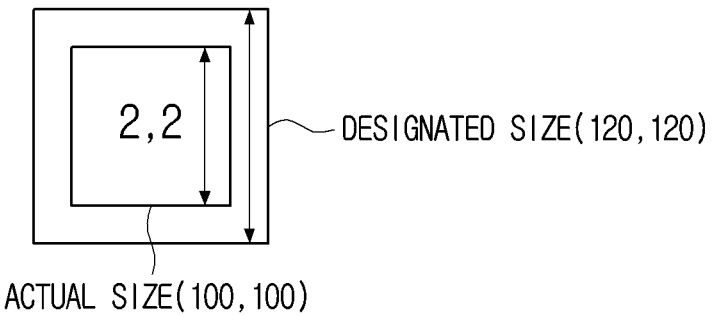
FIG. 9 is a diagram illustrating coordinate information according to an embodiment of the disclosure.

FIG. 9 is a diagram illustrating coordinate information according to an embodiment of the disclosure.

Referring to FIG. 9, the processor 120 may allocate coordinate information to areas corresponding to each of a plurality of display modules 10-1 . . . 10-*n* based on the first captured image A.

For example, when the left upper end of the first captured image A is (0, 0), the processor 120 may identify the area from a start coordinate (Start xy) (60, 50) to an end coordinate (End xy) (160, 150) in the first captured image A as the area corresponding to the first display module 10-1. Subsequently, the processor 120 may allocate location information (0, 0) to an area corresponding to the first display module 10-1.

As another example, the processor 120 may identify the area from the start coordinate (560, 250) to the end coordinate (660, 150) in the first captured image A as the area corresponding to the eighteenth display module 10-18. Subsequently, the processor 120 may allocate location information (2, 5) to an area corresponding to the eighteenth display module 10-18.

In the meantime, the processor 120 may scale (e.g., enlarge) the size of an area corresponding to each of the plurality of display modules 10-1 . . . 10-*n* to allocate first coordinate information to each of the plurality of display modules.

For example, the processor 120 may adjust an area corresponding to the first display module 10-1 from a start coordinate (Start xy) (60, 50) identified in the first captured image A to (50, 40), and may adjust an area from the end coordinate (End xy) (160, 150) to (170, 160).

That is, the area corresponding to the first display module 10-1 is the area from the adjusted start coordinate (50, 40) to the adjusted end coordinate (170, 160) and the processor 120 may allocate the adjusted start coordinate and the adjusted end coordinate as the first coordinate information corresponding to the first display module 10-1.

As another example, the processor 120 may adjust an area corresponding to the eighteenth display module 10-18 from the start coordinate (560, 250) identified in the first captured image A to (550, 240) and adjust from the end coordinate (660, 150) to (670, 360).

That is, an area corresponding to the 18th display module 10-1 is an area from the adjusted start coordinate (550, 240) to the adjusted end coordinate (670, 360), and the processor 120 may allocate the adjusted start coordinates and the adjusted end coordinates as first coordinate information corresponding to the eighteenth display module 10-18.

Then, the processor 120 may identify the start coordinate and the end coordinate of the area where the different image is displayed in the second captured image B and may allocate the identified start coordinate and the end coordinate as the second coordinate information.

Then, the processor 120 may identify one coordinate information including second coordinate information among first coordinate information allocated to each of the plurality of display modules 10-1 . . . 10-$n$.

For example, the processor 120 may identify an area in which different images are displayed in the second captured image B, and allocate from the start coordinate (260, 250) to the end coordinate (360, 350) in the identified area as the second coordinate information.

Then, the processor 120 may identify at least one first coordinate information including second coordinate information (i.e., start coordinate (260, 250) to end coordinate (360, 350)) from among the plurality of first coordinate information.

Referring to FIG. 9, the processor 120 may identify that first coordinate information (from the start coordinate (250, 240) to the end coordinate (370, 360)) allocated to a fifteenth display module 10-15 among the plurality of first coordinate information includes second coordinate information (from the start coordinate (260, 250) to the end coordinate (360, 350)). Subsequently, the processor 120 may identify location information (2, 2) allocated to the fifteenth display module 10-1 as location information of any one display module displaying different images in the second captured image B based on the table shown in FIG. 9.

As shown in the upper portion of FIG. 9, the processor 120 may enlarge an actual size, that is, a size corresponding to each of the plurality of display modules 10-1 . . . 10-$n$ identified by the processor 120 using the first captured image A. Here, the actual size corresponds to the actual coordinate (i.e., the first coordinate information) of FIG. 9, and the enlarged size corresponds to the designated coordinate (i.e., the adjusted first coordinate) of FIG. 9.

In addition to the first captured image A, the result of the comparison between the first captured image A and the second captured image B may deteriorate reliability since the focus may be changed according to the movement of the camera 200 while the camera 200 obtains the second captured image B, and due to the shaking of the user controlling the camera 200, or the like.

Accordingly, the processor 120 may enlarge the size of an area corresponding to each of the plurality of display modules 10-1 . . . 10-$n$ identified based on the first captured image A, identify any one area including an area in which different images are displayed in the second captured image B, and obtain location information of the display module 10 corresponding to the identified area.

FIG. 10 is a flowchart illustrating a method for controlling an electronic device according to an embodiment of the disclosure.

The control method of the electronic device according to an embodiment includes, firstly, obtaining a first captured image of a display device outputting a first image in operation S1010.

Then, the method includes obtaining proportion information of the display device based on size information of an area corresponding to the first image in the first captured image in operation S1020.

Then, the method includes obtaining layout information of the plurality of display modules based on the proportion information of the display device and information related to the plurality of display modules in operation S1030.

Then, the method includes allocating, based on the layout information, location information to areas respectively corresponding to the plurality of display modules in the first captured image in operation S1040.

Then, the method includes transmitting, to the display device through the communication interface, a second image in which a first display module from among the plurality of display modules outputs an image different from the images of the remaining modules in operation S1050.

Then, the method includes identifying an area in which the different image is displayed in a second captured image of the display device outputting the second image in operation S1060.

Then, the method includes obtaining location information corresponding to the identified area by comparing the first captured image with the second captured image in operation S1070.

Then, the method includes obtaining the obtained location information as location information of the first display module in operation S1080.

Here, the method according to an embodiment may further include transmitting, to the display device, a third image in which a second display module from among the plurality of display modules outputs an image different from the images of the remaining modules, identifying an area in which the different image is displayed in a third captured image of the display device outputting the third image; obtaining location information allocated to the area where the different image is displayed among the location information allocated to the areas corresponding to each of the plurality of display modules by comparing the first captured image and the second captured image, and identifying the location information as the location information of the second display module in the display device.

The method according to an embodiment may further include transmitting the location information of the first display module and the location information of the second display module to the display device.

The information related to the plurality of display modules may include at least one of information about a number of the plurality of display modules or information about a size of each of the plurality of display modules, and the obtaining the layout information in operation S1030 may further include obtaining plurality of candidate layout information based on the information about the number of the plurality of display modules and identifying any one of the plurality of candidate layout information based on the size information of each of the plurality of display modules and proportion information of the display device.

The first image according to an embodiment may be an image in which each of the plurality of modules outputs a same image.

The method according to an embodiment may further include providing the first captured image obtained through the camera through the display, displaying a guideline to distinguish areas corresponding to each of the plurality of display modules in the first captured image based on the layout information of the plurality of display modules, and while the second captured image obtained through the camera is displayed, displaying the guideline on an area corresponding to the display device in the second captured image.

The allocating the location information in operation S1040 according to an embodiment may include allocating first coordinate information to an area corresponding to each of the plurality of display modules in the first captured image, and the obtaining the location information in operation S1070 may include allocating second coordinate information to an area in which the different image is displayed in the second captured image, identifying an area corresponding to the second coordinate information among a plurality of first coordinate information, and obtaining the location information corresponding to the identified area as location information of the first display module.

Here, the allocating the first coordinate information may include allocating the first coordinate information by scaling a size of an area corresponding to each of the plurality of display modules, and the obtaining the location information in operation S1070 may include identifying one first coordinate information comprising the second coordinate information among the plurality of first coordinate information, and obtaining location information corresponding to the area to correspond to the identified first coordinate information as location information of the first display module.

The various embodiments may be applicable to not only electronic devices but also all types of electronic devices including a display.

The various example embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the electronic device according to the various embodiments described above may be stored in a non-transitory computer-readable medium. The computer instructions stored in this non-transitory computer-readable medium cause the above-described specific device to perform the processing operations of the electronic device 100 according to the above-described various embodiments when executed by the processor of the specific device.

The non-transitory computer readable medium may refer, for example, to a medium that stores data, such as a register, a cache, a memory or etc., and is readable by a device. For example, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), or the like, and may be provided.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. An electronic device comprising:
a communication interface that communicates with a display device comprising a plurality of display modules; and
a processor configured to:
obtain a first captured image of the display device outputting a first image,
obtain proportion information of the display device based on size information of an area corresponding to the first image in the first captured image,
obtain a plurality of candidate layout information based on a number of the plurality of display modules, obtain a plurality of candidate proportions based on the plurality of candidate layout information and a size of each of the plurality of display modules,
determine, as layout information of the plurality of display modules, one candidate proportion from among the plurality of candidate proportions that corresponds to the proportion information of the display device,
allocate, based on the layout information, location information to areas respectively corresponding to the plurality of display modules in the first captured image,
transmit, to the display device through the communication interface, a second image in which a first display module from among the plurality of display modules outputs an image different from images of remaining display modules from among the plurality of display modules,
identify an area in which the different image is displayed in a second captured image of the display device outputting the second image,
obtain, among the location information allocated to the areas respectively corresponding to the plurality of display modules, location information corresponding to the identified area by comparing the first captured image with the second captured image, and
obtain the obtained location information as location information of the first display module.

2. The electronic device of claim 1, wherein the processor is further configured to:
transmit, to the display device through the communication interface, a third image in which a second display module from among the plurality of display modules outputs an image different from images of remaining display modules from among the plurality of display modules,
identify an area in which the different image is displayed in a third captured image of the display device outputting the third image,
obtain location information allocated to the area in which the different image is displayed among the location information allocated to the areas respectively corresponding to the plurality of display modules by comparing the first captured image and the second captured image, and
identify the obtained location information allocated to the area in which the different image is displayed as the location information of the second display module in the display device.

3. The electronic device of claim 2, wherein the processor is configured to transmit the location information of the first display module and the location information of the second display module to the display device through the communication interface.

4. The electronic device of claim 1, wherein the first image is an image in which each of the plurality of display modules outputs a same image.

5. The electronic device of claim 1, further comprising:
a camera; and
a display,
wherein the processor is further configured to:
provide the first captured image obtained through the camera through the display,
control the display to display a guideline to distinguish areas corresponding to each of the plurality of display modules in the first captured image based on the layout information, and while the second captured image obtained through the camera is displayed, control the display to display the guideline on an area corresponding to the display device in the second captured image.

6. The electronic device of claim 1, wherein the processor is further configured to:

allocate first coordinate information to areas respectively corresponding to each of the plurality of display modules in the first captured image, allocate second coordinate information to an area in which the different image is displayed in the second captured image, identify an area corresponding to the second coordinate information among the first coordinate information, and obtain, among the location information allocated to the areas respectively corresponding to the plurality of display modules, location information corresponding to the identified area corresponding to the second coordinate information as the location information of the first display module.

7. The electronic device of claim 6, wherein the processor is further configured to:

allocate the first coordinate information by scaling sizes of areas respectively corresponding to each of the plurality of display modules, identify respective first coordinate information comprising the second coordinate information among the first coordinate information, and obtain, among the location information allocated to the areas respectively corresponding to the plurality of display modules, location information allocated to an area that corresponds to the identified respective first coordinate information as location information of the first display module.

8. A control method of an electronic device, the control method comprising:

obtaining a first captured image of a display device, comprising a plurality of display modules, outputting a first image;

obtaining proportion information of the display device based on size information of an area corresponding to the first image in the first captured image;

obtaining a plurality of candidate layout information based on a number of the plurality of display modules;

obtaining a plurality of candidate proportions based on the plurality of candidate layout information and a size of each of the plurality of display modules;

determining, as layout information of the plurality of display modules, one candidate proportion from among the plurality of candidate proportions that corresponds to the proportion information of the display device;

allocating, based on the layout information, location information to areas respectively corresponding to the plurality of display modules in the first captured image;

transmitting, to the display device through a communication interface, a second image in which a first display module from among the plurality of display modules outputs an image different from images of remaining display modules from among the plurality of display modules;

identifying an area in which the different image is displayed in a second captured image of the display device outputting the second image;

obtaining, among the location information allocated to the areas respectively corresponding to the plurality of display modules, location information corresponding to the identified area by comparing the first captured image with the second captured image; and obtaining the obtained location information as location information of the first display module.

9. The control method of claim 8, further comprising:

transmitting, to the display device, a third image in which a second display module from among the plurality of display modules outputs an image different from images of remaining display modules from among the plurality of display modules;

identifying an area in which the different image is displayed in a third captured image of the display device outputting the third image;

obtaining location information allocated to the area in which the different image is displayed among the location information allocated to the areas respectively corresponding to the plurality of display modules by comparing the first captured image and the second captured image; and identifying the location information allocated to the area in which the different image is displayed as the location information of the second display module in the display device.

10. The control method of claim 9, further comprising:

transmitting the location information of the first display module and the location information of the second display module to the display device.

11. The control method of claim 8, wherein the first image is an image in which each of the plurality of display modules outputs a same image.

12. The control method of claim 8, further comprising:

providing the first captured image obtained through a camera through a display;

displaying a guideline to distinguish areas corresponding to each of the plurality of display modules in the first captured image based on the layout information; and while the second captured image obtained through the camera is displayed, displaying the guideline on an area corresponding to the display device in the second captured image.

13. The control method of claim 8, wherein the allocating the location information comprises allocating first coordinate information to areas respectively corresponding to each of the plurality of display modules in the first captured image, and the obtaining the location information comprises:

allocating second coordinate information to an area in which the different image is displayed in the second captured image, identifying an area corresponding to the second coordinate information among the first coordinate information, and obtaining, among the location information allocated to the areas respectively corresponding to the plurality of display modules, location information corresponding to the identified area corresponding to the second coordinate information as the location information of the first display module.

14. The control method of claim 13, wherein the allocating first coordinate information comprises allocating the first coordinate information by scaling sizes of areas respectively corresponding to each of the plurality of display modules, and the obtaining the location information comprises:

identifying respective first coordinate information comprising the second coordinate information among the first coordinate information, and obtaining, among the location information allocated to the areas respectively corresponding to the plurality of display modules, location information allocated to an area that corresponds to the identified respective first coordinate information as location information of the first display module.

15. A non-transitory computer-readable recording medium including a program for executing a control method of an electronic device, the control method of the electronic device includes:

obtaining a first captured image of a display device, comprising a plurality of display modules, outputting a first image;

obtaining proportion information of the display device based on size information of an area corresponding to the first image in the first captured image;

obtaining a plurality of candidate layout information based on a number of the plurality of display modules;

obtaining a plurality of candidate proportions based on the plurality of candidate layout information and a size of each of the plurality of display modules;

determining, as layout information of the plurality of display modules, one candidate proportion from among the plurality of candidate proportions that corresponds to the proportion information of the display device;

allocating, based on the layout information, location information to areas respectively corresponding to the plurality of display modules in the first captured image;

transmitting, to the display device through a communication interface, a second image in which a first display module from among the plurality of display modules outputs an image different from images of remaining display modules from among the plurality of display modules;

identifying an area in which the different image is displayed in a second captured image of the display device outputting the second image;

obtaining, among the location information allocated to the areas respectively corresponding to the plurality of display modules, location information corresponding to the identified area by comparing the first captured image with the second captured image; and obtaining the obtained location information as location information of the first display module.

* * * * *